(12) United States Patent
Kuske et al.

(10) Patent No.: US 9,739,194 B2
(45) Date of Patent: Aug. 22, 2017

(54) CHARGE-AIR INTERCOOLER SYSTEM WITH INTEGRATED HEATING DEVICE

(71) Applicant: Ford Global Technologies, LLC, Dearborn, MI (US)

(72) Inventors: Andreas Kuske, Geulle (NL); Franz Arnd Sommerhoff, Aachen (DE); Hans Guenter Quix, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 663 days.

(21) Appl. No.: 14/163,529

(22) Filed: Jan. 24, 2014

(65) Prior Publication Data

US 2014/0245735 A1 Sep. 4, 2014

(30) Foreign Application Priority Data

Mar. 4, 2013 (DE) .......... 10 2013 203 643

(51) Int. Cl.
*F02B 29/04* (2006.01)

(52) U.S. Cl.
CPC ........ *F02B 29/045* (2013.01); *F02B 29/0443* (2013.01); *F02B 29/0468* (2013.01); *Y02T 10/146* (2013.01)

(58) Field of Classification Search
CPC F02B 29/0443; F02B 29/045; F02B 29/0468; Y02T 10/146
See application file for complete search history.

(56) References Cited

U.S. PATENT DOCUMENTS

| | | | |
|---|---|---|---|
| 979,618 A * | 12/1910 | Weir | F28D 7/0041 |
| | | | 122/32 |
| 3,760,870 A * | 9/1973 | Guetlhuber | B01J 8/067 |
| | | | 165/103 |
| 4,086,956 A * | 5/1978 | Block | E04H 4/129 |
| | | | 165/297 |
| 4,385,594 A * | 5/1983 | Hauser, Jr. | F01P 3/20 |
| | | | 123/41.29 |

(Continued)

FOREIGN PATENT DOCUMENTS

| | | |
|---|---|---|
| CN | 201916043 U | 8/2011 |
| DE | 102006033314 A1 | 3/2007 |

(Continued)

*Primary Examiner* — Phutthiwat Wongwian
*Assistant Examiner* — Matthew T Largi
(74) *Attorney, Agent, or Firm* — Julia Voutyras; McCoy Russell LLP

(57) ABSTRACT

Methods and systems are provided for a charge air cooling system of an engine. In one example, a turbocharger arrangement includes an internal combustion engine, a turbocharger for supercharging the internal combustion engine, a charge-air intercooler located in an intake tract between the turbocharger and the internal combustion engine, and an auxiliary cooling system including a first feed line for supplying a first coolant to the charge-air intercooler, the first feed line positioned upstream of the charge-air intercooler and downstream of a cooling element, the first feed line including a heat recovery element. The heat recovery element may exchange heat between the first coolant and a heat transfer medium, the heat transfer medium including one of engine coolant or exhaust gas.

17 Claims, 7 Drawing Sheets

(56) References Cited

U.S. PATENT DOCUMENTS

| | | | | |
|---|---|---|---|---|
| 4,961,404 A * | 10/1990 | Itakura | | F01P 3/20 |
| | | | | 123/41.29 |
| 6,003,594 A * | 12/1999 | Cameron | | F28F 9/22 |
| | | | | 165/103 |
| 6,253,837 B1 * | 7/2001 | Seiler | | F16H 57/0413 |
| | | | | 137/625.29 |
| 6,868,840 B2 * | 3/2005 | Lewallen | | F02B 29/0418 |
| | | | | 123/563 |
| 2003/0015183 A1 * | 1/2003 | Sealy | | F02B 27/02 |
| | | | | 123/563 |
| 2006/0032626 A1 * | 2/2006 | Keen | | F28D 1/05383 |
| | | | | 165/280 |
| 2009/0031999 A1 | 2/2009 | Erickson | | |
| 2009/0056909 A1 * | 3/2009 | Braun | | F28D 7/1684 |
| | | | | 165/54 |
| 2010/0139626 A1 * | 6/2010 | Raab | | F02M 26/28 |
| | | | | 123/540 |
| 2010/0229549 A1 | 9/2010 | Taylor | | |
| 2011/0000446 A1 * | 1/2011 | Kardos | | F01P 7/165 |
| | | | | 123/41.02 |
| 2011/0088378 A1 * | 4/2011 | Prior | | F01M 5/001 |
| | | | | 60/320 |
| 2012/0297765 A1 | 11/2012 | Vigild et al. | | |

FOREIGN PATENT DOCUMENTS

| | | |
|---|---|---|
| DE | 102005047653 A1 | 4/2007 |
| DE | 102006050806 A1 | 3/2008 |
| DE | 102008015591 A1 | 10/2009 |
| DE | 102008049204 A1 | 4/2010 |
| DE | 102012004008 A1 | 9/2012 |
| EP | 1724453 A1 | 11/2006 |
| EP | 2213859 A2 | 8/2010 |
| EP | 2418370 A2 | 2/2012 |
| WO | 2009130083 A1 | 10/2009 |

* cited by examiner

CHARGE-AIR INTERCOOLER SYSTEM WITH INTEGRATED HEATING DEVICE

CROSS REFERENCE TO RELATED APPLICATIONS

The present application claims priority to German Patent Application No. 102013203643.4, filed on Mar. 4, 2013, the entire contents of which are hereby incorporated by reference for all purposes.

FIELD

The present description relates generally to methods and systems for a turbocharger arrangement having an internal combustion engine that can be supercharged by means of at least one turbocharger, and a charge-air intercooler, which is located in an intake tract between the turbocharger and the internal combustion engine and which is arranged in a cooling system, and wherein the charge-air intercooler comprises a coolant inlet line for supplying the coolant of the cooling system.

BACKGROUND/SUMMARY

Charge-air intercoolers are used, in a manner known in the art, to cool the air compressed by the turbocharger, or an air mixture composed of recirculated exhaust gas and fresh air. During the cooling of the air or the air mixture moisture, for example water from the air or the air mixture, may condense in the intake tract of the internal combustion engine, particularly in the charge-air intercooler. In order to prevent the liquid condensate escaping from the intake tract into the internal combustion engine and causing damage to the internal combustion engine and/or to sub-systems thereof, for example due to corrosion, the condensate must be removed from the intake tract.

Other attempts to address condensate formation in the charge-air intercoolers include collecting condensate, produced during cooling of the charge air, in a condensate reservoir and then draining this off. For example, this is shown by US 2010/0229549 A1, US2009/0031999 A1 and CN 201916043 U. Another possibility is to vaporize the condensate by supplying heat, that is to say by means of the hot charge air or the hot fresh air/exhaust gas mixture, so that the water vapor is fed to the internal combustion engine with the air/gas mixture, as described, for example, in WO2009/130083 A1 and DE 10 2006 050 806 A1.

EP 1 724 453 A1 also describes a thermal disposal of the condensate. Thermal disposal of the condensate is performed in three steps. A first step is to provide an exhaust-gas heated heat exchanger for heating the condensate. The second step is to provide a thermal reactor, which comprises a PTC heating element and which shuts off automatically when no condensate accumulates. A third step is to provide a further thermal reactor for residual heating, the vaporized condensate being electrically heated to 450° C., so that the nitric acid vapor is converted into its harmless constituents.

DE 10 2006 033 314 A1 describes a device and a method intended to avoid the formation of a condensate. Here, for example, any cooling of the surfaces of the heat exchanger below the limit is avoided by keeping its coolant temperature above the dew point of the medium to be cooled. This is to be achieved by reducing the quantity of coolant in the charge-air intercooler, for example, in extreme cases even reducing the coolant flow to ZERO, until the temperature of the coolant once again exceeds the lower temperature limit.

EP 2 418 370 A2 describes a method for regulating the temperature of the gas system of an internal combustion engine, recirculated exhaust gases and fresh air being compressed in a turbocharger. A first method for regulating the temperature of the charge air in the inlet manifold, a second method for regulating the exhaust gas recirculation rate and/or a third method for regulating the temperature of the recirculated exhaust gas as a function of the operating state of the internal combustion engine are performed in series and/or simultaneously.

EP 2 213 859 A2 is concerned with a method for regulating a charge-air intercooler, in which charge air mixed with the recirculated exhaust gas is cooled by leading it through the charge-air intercooler, the cooling capacity of the charge-air intercooler during operating of the internal combustion engine being adjusted as a function of two threshold values of the charge-air temperature of the charge-air intercooler.

Against this background this invention offers a solution for avoiding condensate formation despite recirculated exhaust gas being present and despite running the charge through a charge air cooler without the need for generating additional heat energy.

Further, increasing the dew point temperature at the charge-air intercooler may require generation of additional thermal energy. However, this may increase energy expenditures of the engine.

In one example, the issues described above may be addressed by a turbocharger arrangement comprising an internal combustion engine, a turbocharger for supercharging the internal combustion engine, and a charge-air intercooler located in an intake tract between the turbocharger and the internal combustion engine. The turbocharger arrangement further includes an auxiliary cooling system including a first feed line for supplying a first coolant to the charge-air intercooler, the first feed line positioned upstream of the charge-air intercooler and downstream of a cooling element, the first feed line including a heat recovery element. The heat recovery element may exchange heat between the first coolant and a heat transfer medium, the heat transfer medium including one of engine coolant or exhaust gas.

In one example, a second coolant from a main cooling system may be fed to the heat recovery element, a second feed line branching off from a bypass avoiding a main radiator and leading to the heat recovery element, a return line carrying the second coolant drawn from the bypass from the heat recovery element to a coolant pump. In this example, the heat recovery element is a coolant-coolant heat exchanger. As such, the first coolant may be heated by hotter engine coolant in the heat recovery element. In another example, exhaust gases of the internal combustion engine may be fed into the heat recovery element. In this example, the heat recovery element is a gas-coolant heat exchanger and hotter exhaust gases may heat the first coolant in the heat recovery element. In this way, the formation of a condensate in a charge-air intercooler can be reduced by increasing a temperature of the first coolant (e.g., the charge-air intercooler coolant), without the need to generate additional thermal energy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a charge air cooling system of an engine. A turbocharger arrangement may comprise an internal combustion engine that can be supercharged by means of at least one turbocharger, in particular a spark-ignition or a diesel engine of a motor vehicle. The arrangement further includes a charge-air intercooler, which is located in an intake tract between the turbocharger and the internal combustion engine. As shown in FIGS. 1-2, the charge-air intercooler is arranged in a cooling system. The cooling system includes a coolant inlet line for supplying coolant of the cooling system to the charge-air intercooler. Upstream of the charge-air intercooler and downstream of a cooling element, the coolant inlet line comprises a heat recovery element. The heat recovery element serves to heat coolant flowing into the charge-air intercooler to a temperature in excess of a dew point of the medium to be cooled (e.g., charge air) in the charge-air intercooler. The cooling element may take the form of a low-temperature cooler of an auxiliary cooling system.

Figure 1A:
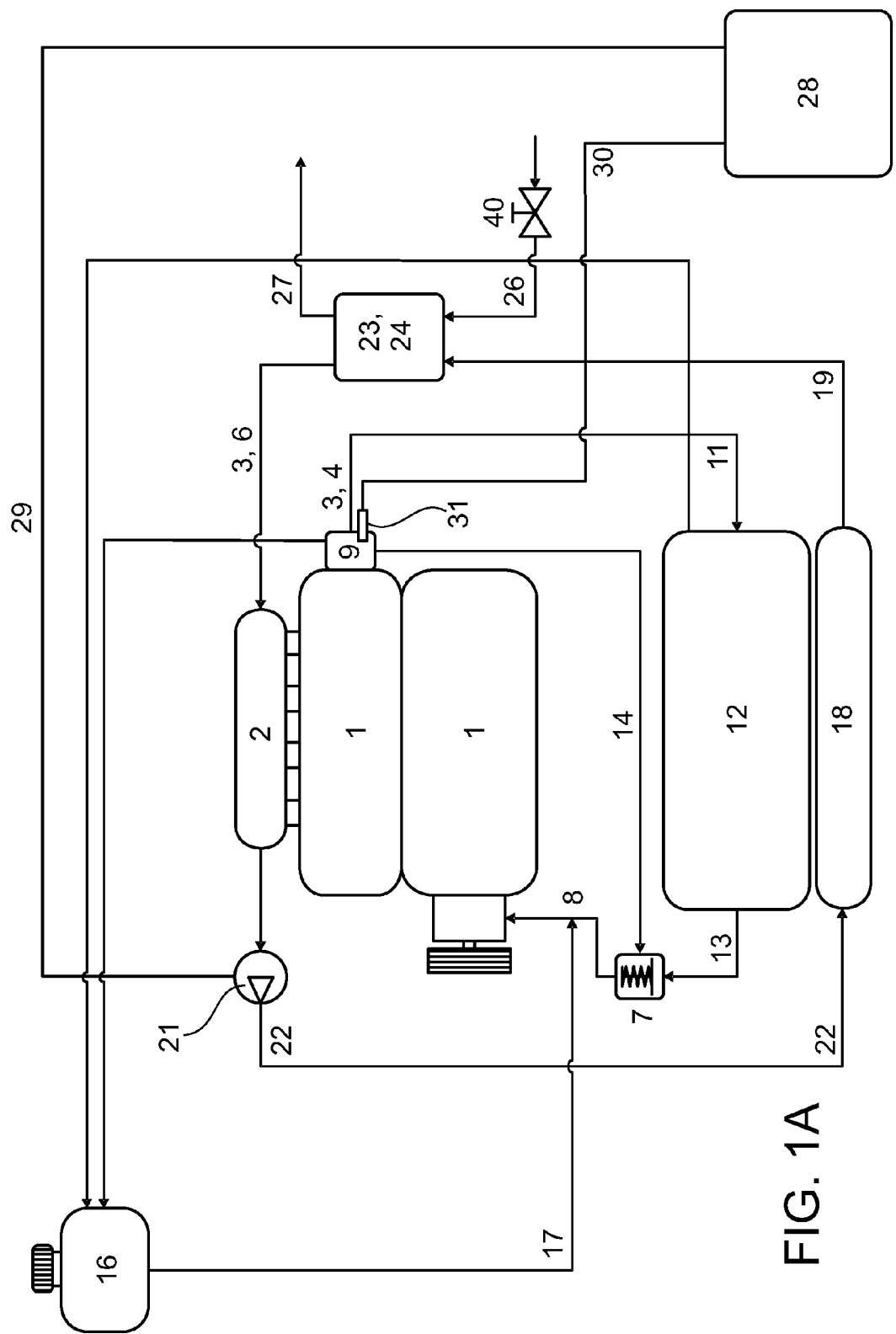
FIG. 1A shows a schematic view of a first development of a cooling system of a charge-air intercooler, using exhaust gas for heating the heat recovery element.
Figure 1B:
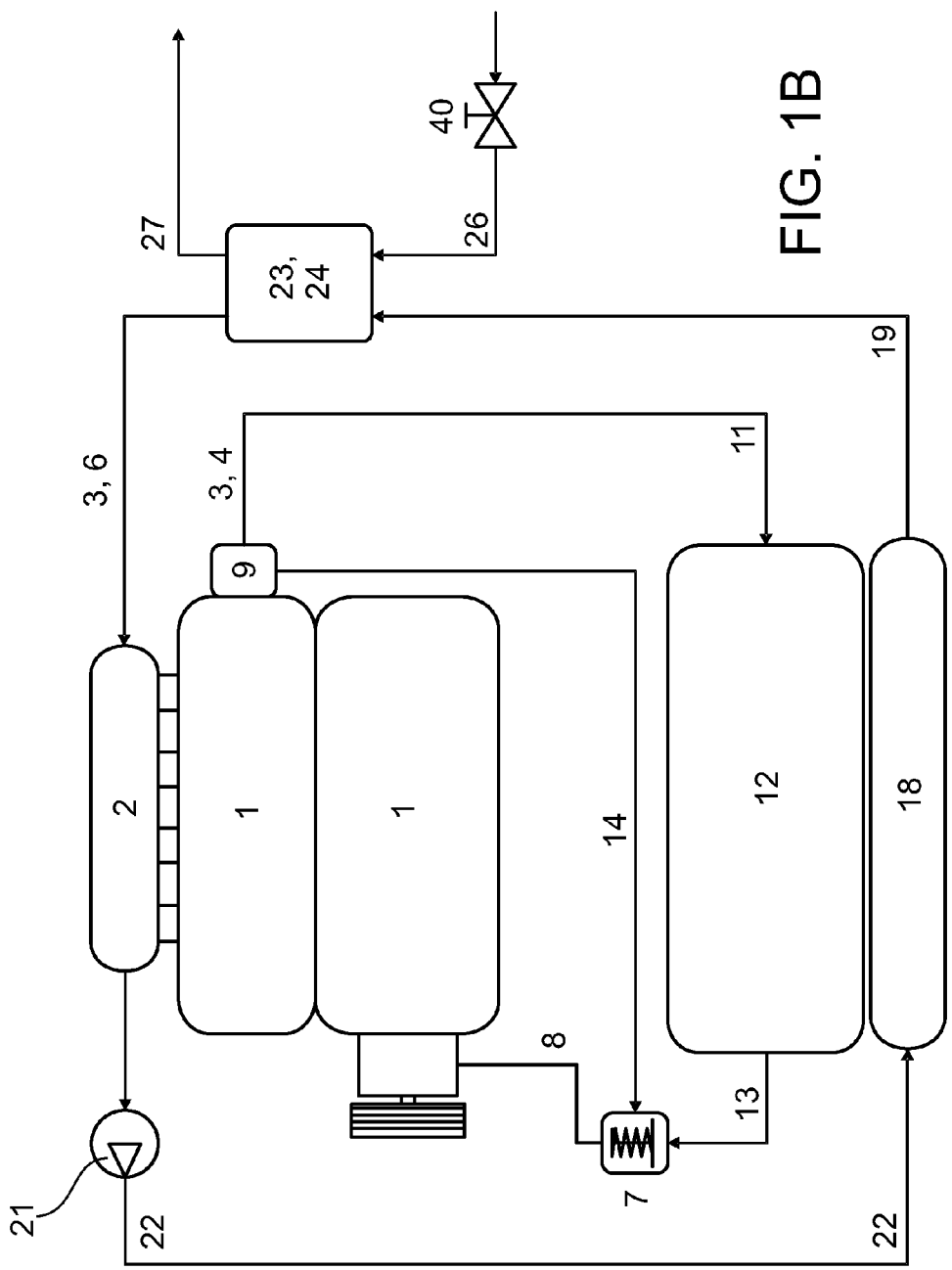
FIG. 1B shows a schematic view of a first development of a cooling system of a charge-air intercooler, using exhaust gas for heating the heat recovery element, without control lines and degas system.
Figure 1C:
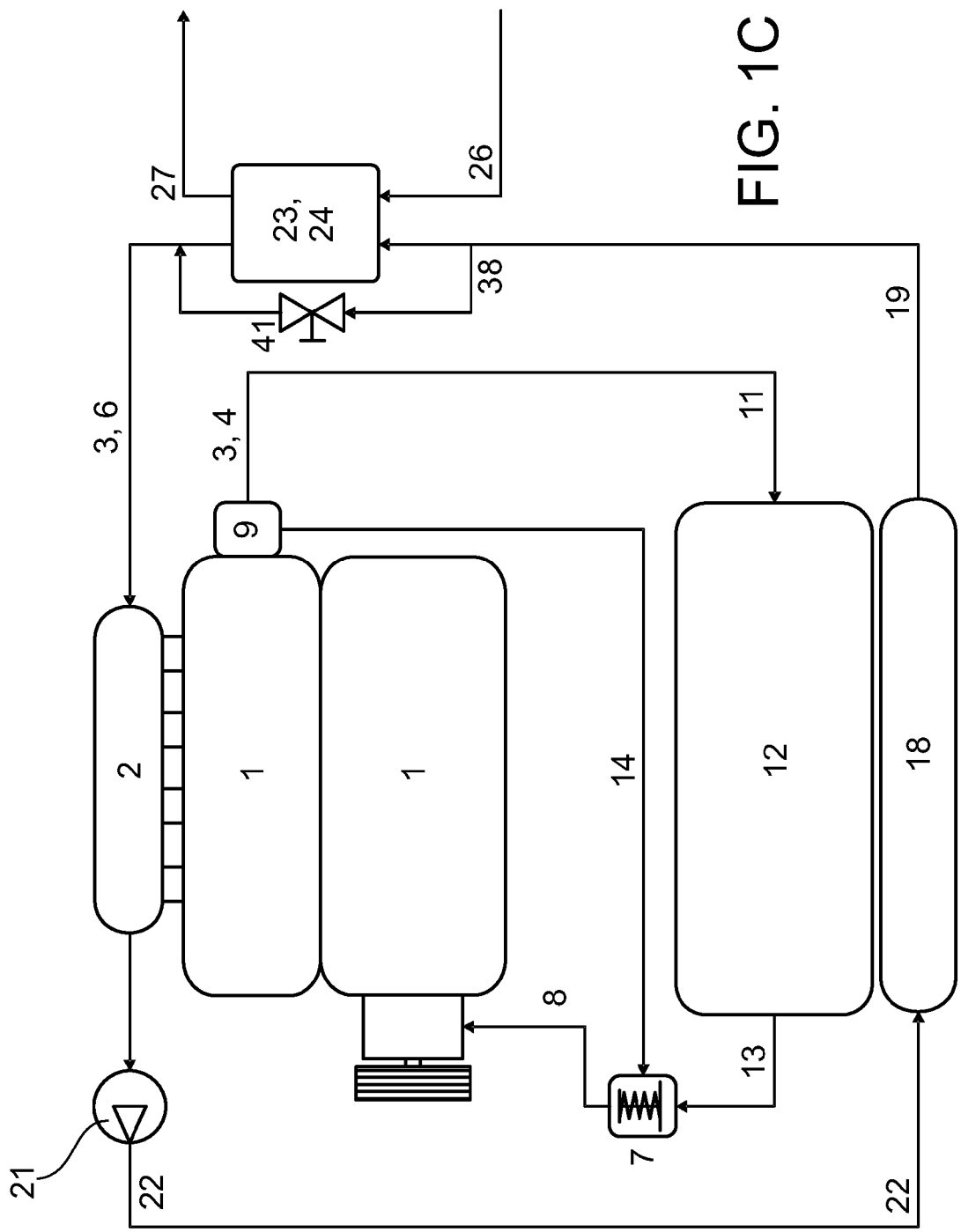
FIG. 1C shows a schematic view of a first development of a cooling system of a charge-air intercooler, using exhaust gas for heating the heat recovery element and a bypass system.
Figure 2A:
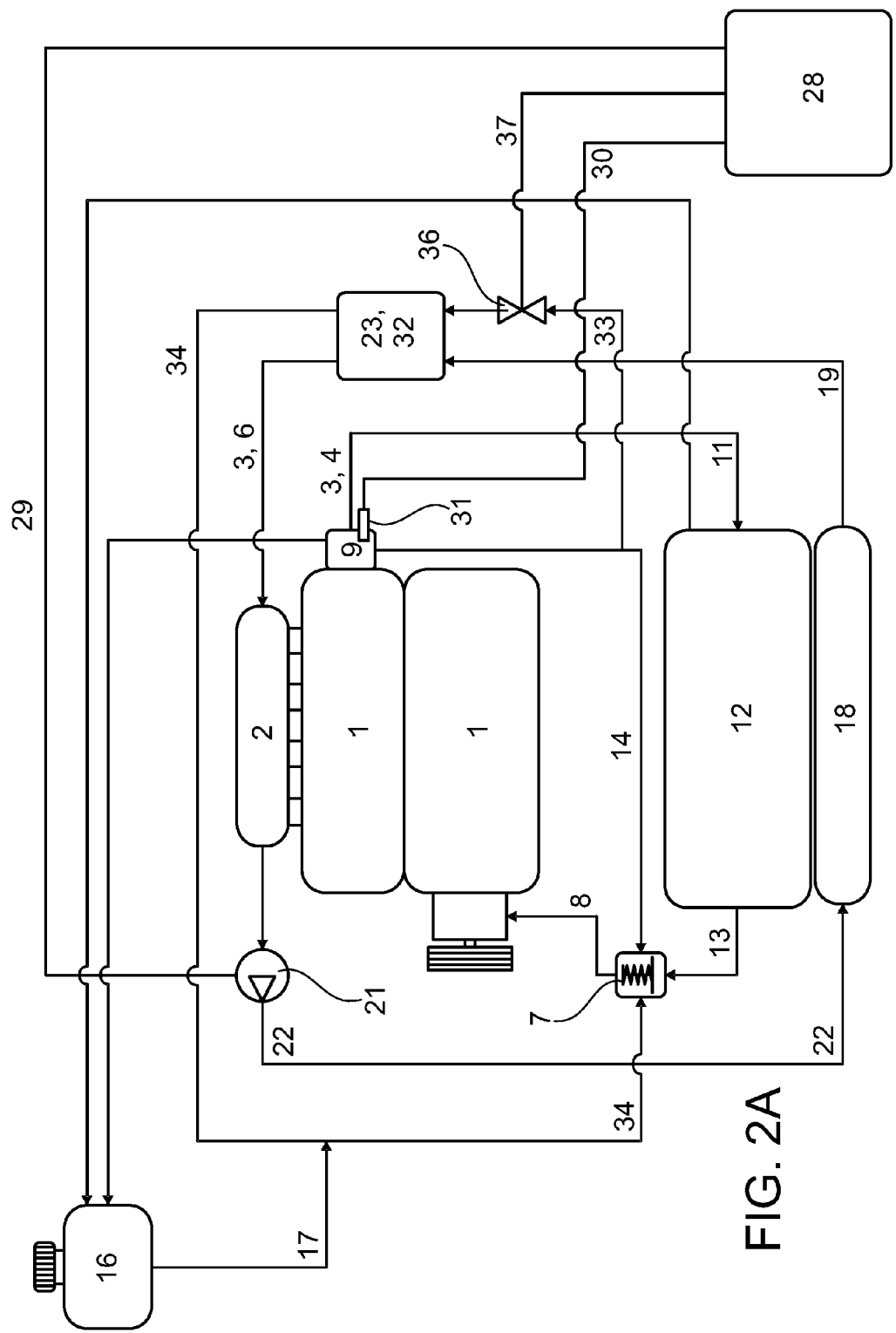
FIG. 2A shows a schematic view of a first development of a cooling system of a charge-air intercooler, using the main cooling circuit for heating the heat recovery element.
Figure 2B:
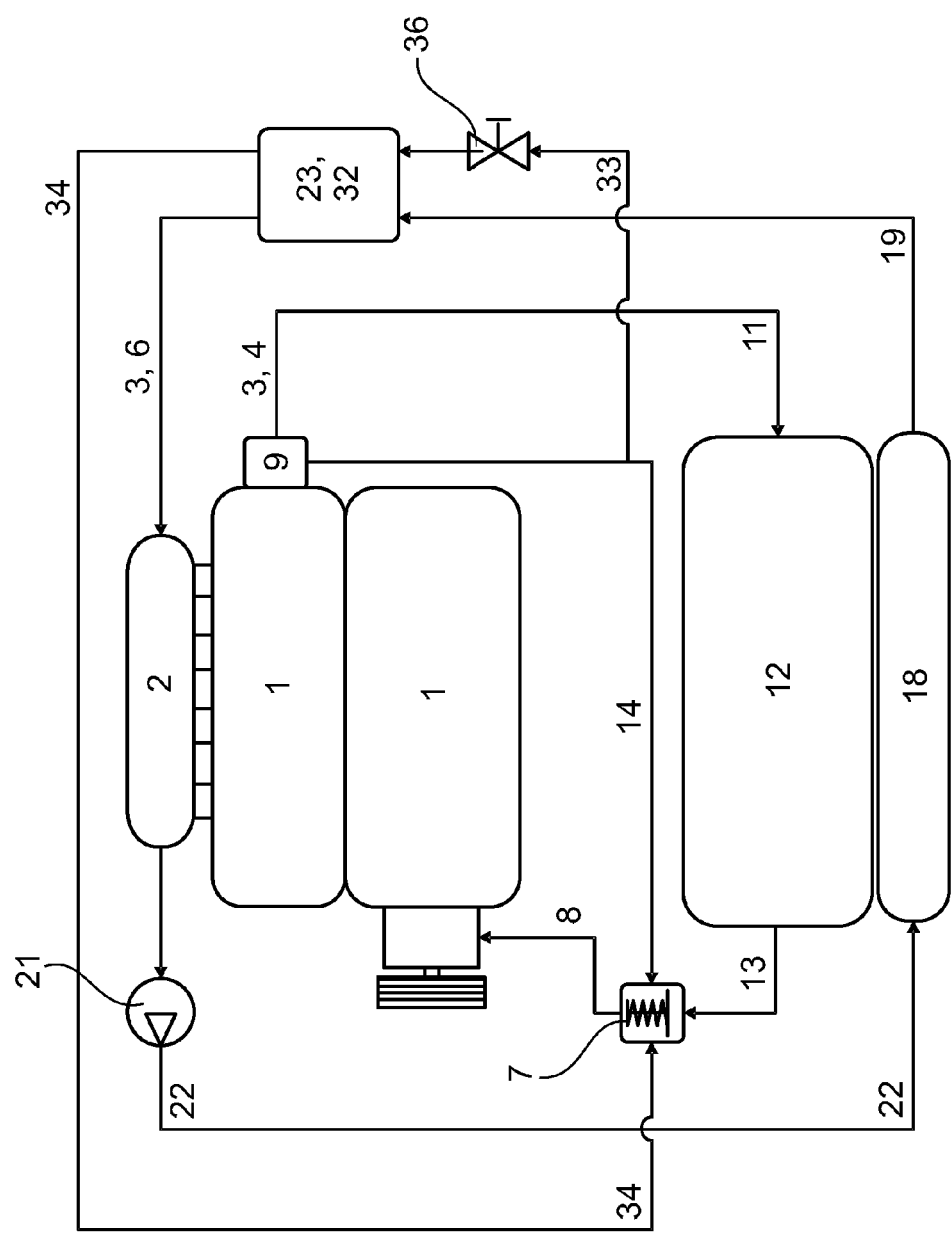
FIG. 2B shows a schematic view of a first development of a cooling system of a charge-air intercooler, using the main cooling circuit for heating the heat recovery element, without control lines and degas system.
Figure 2C:
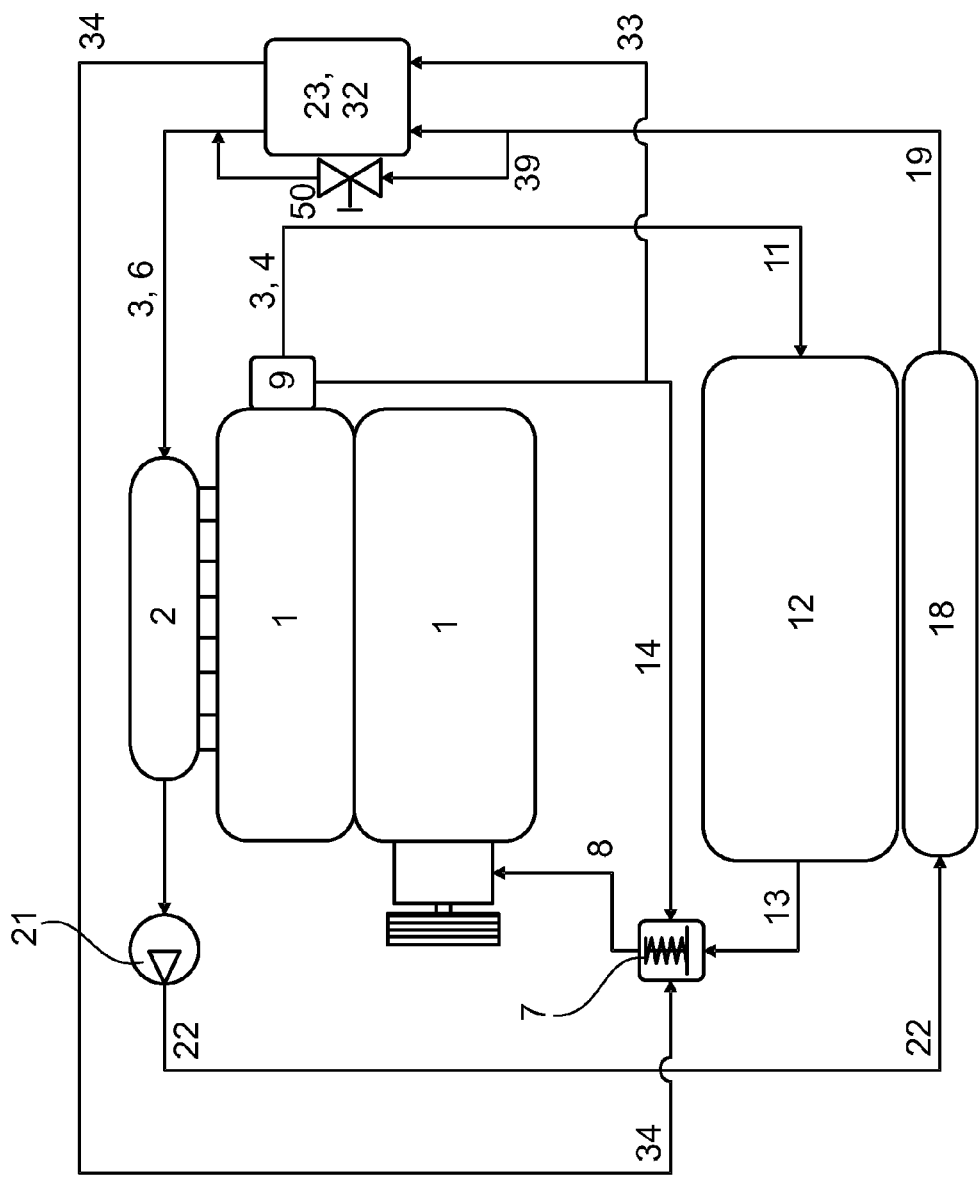
FIG. 2C shows a schematic view of a first development of a cooling system of a charge-air intercooler, using the main cooling circuit for heating the heat recovery element and a bypass system.
Figure 3:
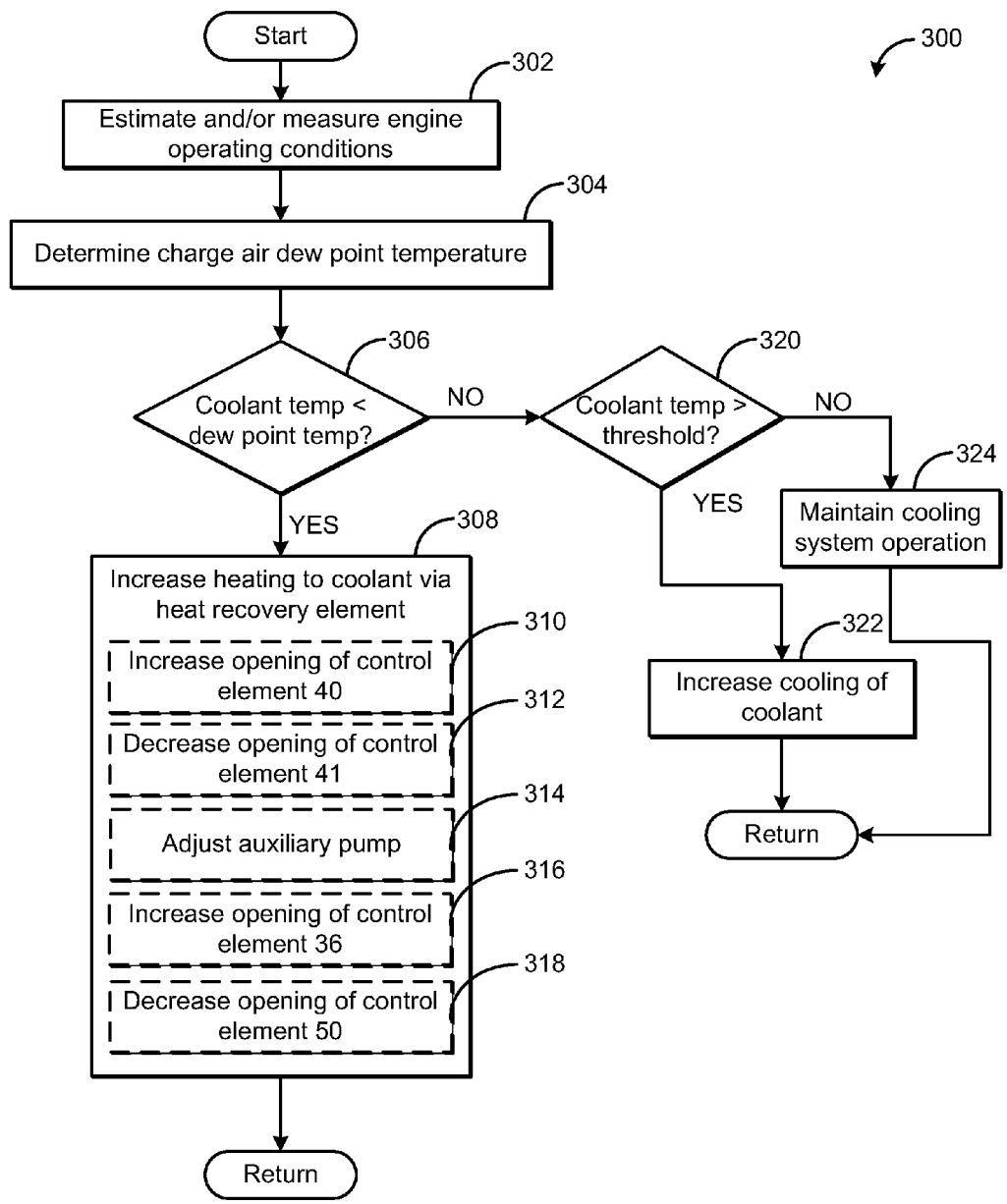
FIG. 3 shows a flow chart of a method for adjusting heating of coolant in an auxiliary cooling system.

FIGS. 1A-C show a first embodiment wherein the heat recovery element is a gas-coolant heat exchanger which transfers heat to the coolant via heated exhaust gases passing through the heat recovery element. FIGS. 2A-C show a second embodiment wherein the heat recovery element is a coolant-coolant heat exchanger which transfers heat to the coolant of the charge-air intercooler cooling system from heated engine coolant of a main engine cooling system. In this way, an already heated medium (e.g., hot exhaust gases discharged from the engine or hot engine coolant leaving the engine) may transfer heat to the charge-air intercooler coolant by passing both the coolant and the heated medium through the heat recovery element. FIG. 3 shows a method for adjusting one or more control elements and/or pumps to adjust the flow of coolant and/or the heated medium through the heat recovery element. The amount of heating supplied to the charge-air intercooler coolant may be based on one or more of a dew point temperature of the charge air flowing through the charge-air intercooler, a temperature of the charge-air intercooler coolant, a temperature of the exhaust gases, and/or a temperature of the main engine coolant. In this way, a temperature of the charge-air intercooler coolant may be maintained above a dew point temperature, thereby reducing condensate formation within the charge-air intercooler. At the same time, the temperature of the charge-air intercooler coolant may be maintained below a threshold temperature such that adequate cooling is provided to the charge air before entering the intake manifold of the engine.

In a one embodiment, the cooling system comprises a main cooling system and an auxiliary cooling system. The two systems may be separated from one another, the main cooling system comprising a coolant pump and a main radiator, and the auxiliary cooling system comprising an auxiliary pump and a low-temperature cooler. Cooled coolant from the auxiliary cooling system is usually fed to the charge-air intercooler. It is therefore useful, if the heat recovery element is designed so that the temperature of another medium or an identical medium can be transmitted to the coolant. The heat recovery element may thus be embodied as a gas-coolant heat exchanger or as a coolant-coolant heat exchanger.

FIGS. 1A-C show a first embodiment of a cooling system of an engine wherein the heat recovery element 23 is a gas-coolant heat exchanger 24. In the various figures identical parts are always provided with the same reference numerals, so that as a rule these are also described only once. In FIG. 1A, a cooling system 3 of an internal combustion engine 1 is represented schematically, with a turbocharger arrangement (not visible) of a motor vehicle not shown in more detail. The turbocharger arrangement comprises the internal combustion engine 1 that can be supercharged by means of a turbocharger, and a charge-air intercooler 2 arranged between the turbocharger and the internal combustion engine 1 in an intake tract of the internal combustion engine 1. The internal combustion engine 1 comprises a cylinder block and a cylinder head. The internal combustion engine 1 may be a diesel engine, for example. Instead of a diesel engine a spark-ignition engine may equally well be provided.

The internal combustion engine 1 includes the cooling system 3, which has a main cooling system 4 and an auxiliary cooling system 6. The main cooling system 4 includes a thermostat 7, from which a coolant line 8 leads to the internal combustion engine 1, that is to say to an inlet side of the internal combustion engine 1. Here, a coolant pump in the block may be arranged. In another example, a coolant pump may be arranged upstream of the engine block, either before, after, or integrated with the thermostat 7. On the exhaust side, the internal combustion engine 1 includes an exhaust housing 9, which is arranged on the cylinder head. The exhaust housing 9 may also be referred to herein as the coolant exit housing since both engine coolant and exhaust gases may exit the engine 1 from this housing. From the exhaust housing 9, a radiator line 11 leads to a main radiator 12. From the main radiator 12, a return line 13 leads to the thermostat 7. In addition, a bypass 14 is provided, which emerges from the exhaust housing and leads directly to the thermostat 7. The bypass is coupled between the exhaust housing 9 and the thermostat 7. The bypass 14 serves to bypass the main radiator 12, so that the warm-up phase of the internal combustion engine 1 can be improved. Said another way, during a cold-start condition, engine coolant may be directed through the bypass 14 instead of the main radiator 12 in order to increase the temperature of the engine coolant, thereby increasing an operating temperature of the engine 1. Coolant (e.g., engine coolant) circulates in the main cooling system 4, a vapor separator 16, which in the exemplary embodiment according to FIG. 1A terminates with its return line 17 in the coolant line 8 downstream of the thermostat 7, being arranged in the main cooling system 4.

The auxiliary cooling system 6 is separated from the main cooling system 4, so that the coolant circulating in the main cooling system 4 (e.g., engine coolant) is not mixed with the coolant circulating in the auxiliary cooling system 6 (e.g., charge-air intercooler coolant). Said another way, there is not fluid-fluid interaction between the engine coolant and the charge-air intercooler coolant. The charge-air intercooler 2 is arranged in the auxiliary cooling system 6. A coolant inlet line 19 coming from a low-temperature cooler 18 terminates in the charge-air intercooler 2 and supplies the intercooler with coolant. Downstream of the charge-air intercooler 2, an auxiliary pump 21 is provided, which is arranged in a return line 22, which terminates in the low-temperature cooler 18.

A heat recovery element 23 is arranged in the coolant inlet line 19 of the auxiliary cooling system 6. Specifically, the heat recovery element 23 is directly coupled to the charge-air intercooler 2 via the inlet coolant line 19. Further, the heat recovery element 23 is positioned in the coolant inlet line 19 downstream from the low-temperature cooler 18 and upstream from the charge-air intercooler 2. The heat recovery element 23 is an element which serves for feeding energy that has already been generated and which would be dissipated unused to another medium, so that there is a change, such as an increase, in the temperature of this medium. The heat recovery element 23 is purposively embodied as a heat exchanger, in which coolant is introduced into the coolant inlet line leading to the charge-air intercooler and has a higher outlet temperature than its inlet temperature, the coolant then being fed to the charge-air intercooler at its higher temperature. The coolant in the heat recovery element 23 may be suitably heated to a temperature in excess of the dew point of the medium to be cooled in the charge-air intercooler (e.g., charge air). This represents a simple means of avoiding the formation of condensate in the charge-air intercooler 2.

In the exemplary embodiment shown in FIG. 1A, the heat recovery element 23 is embodied as a gas-coolant heat exchanger 24. Coolant from the auxiliary cooling system 6 and exhaust gases from the internal combustion engine 1 flow simultaneously through the gas-coolant heat exchanger 24. Specifically, the charge-air intercooler coolant flows through a first side of the gas-coolant heat exchanger and exhaust gases flow through a second side of the gas-coolant heat exchanger, the coolant and exhaust gases separated from one another by a heat transfer surface of the heat exchanger.

A branch line 26 is provided, which diverts exhaust gases from the internal combustion engine 1 out of their exhaust path to the gas-coolant heat exchanger 24. A return line 27 is also provided, which returns the exhaust gases back to the exhaust path. An inlet of the branch line 26 may be directly coupled to an exhaust manifold or exhaust passage of the engine 1. In one example, the branch line 26 may be coupled to the exhaust path (or passage) upstream of any exhaust gas aftertreatment systems. The branch line 26 may be coupled at or close to the exhaust manifold of the engine 1 in order to provide the hottest exhaust gases possible to the gas-coolant heat exchanger 24. At least a portion of the exhaust gases flowing from the engine 1 and through the exhaust passage may be directed to the gas-coolant heat exchanger via the branch line 26. The return line 27 may be coupled between an outlet of the gas-coolant heat exchanger and the exhaust path, downstream from the inlet to the branch line 26. In this way, the exhaust gases returning to the exhaust path from the gas-coolant heat exchanger 24 may have a lower temperature than when they left the exhaust path.

It can be seen that in this way the heat of the exhaust gas is recovered, so that the coolant from the auxiliary cooling system 6 is heated by the heat inherent in the exhaust gases, which can be achieved through simple heat transfer from the exhaust gases to the coolant. The coolant can thus be heated to a temperature in excess of the dew point of the medium to be cooled, so that a condensation of water contained in the charge air can be avoided.

Also visible in FIG. 1A is a central control unit 28, which includes a control line 29 to the auxiliary pump 21 and a monitoring line 30 to a temperature sensor 31, to which the exhaust housing 9 (e.g., coolant exit housing) is assigned, in order to absorb the coolant temperature in the exhaust housing 9. Said another way, the control unit 28 may monitor the engine coolant temperature at the exhaust housing 9 via an output of the temperature sensor 31. The control unit 28 may include a controller with memory and computer readable instructions stored thereon for adjusting the auxiliary pump 21, main coolant pump 7, and one or more control elements based on the engine coolant temperature, auxiliary coolant temperature (e.g., charge-air intercooler coolant temperature), charge air temperature, etc. A method for adjusting these elements to control heating of the coolant in auxiliary cooling system 6 is shown at FIG. 3, described further below.

A control element 40, which is advantageously opened, in order to carry exhaust gases to the gas-coolant heat exchanger 24, may be arranged in the branch line 26, which diverts at least a portion of exhaust gases flowing from the internal combustion engine 1 from their exhaust path to the gas-coolant heat exchanger 24. In one example, the control element 40 may be a valve actuatable by the control unit 28 into a plurality of positions between fully opened and fully closed. In another example, the valve may be opened and closed based on pulses sent to the valve from the control unit 28. In the absence of any heat transfer, the control element 40 may keep the branch line 26 closed, thereby stopping the flow of exhaust gases through the gas-coolant heat exchanger 24. Merely for reasons of clarity, FIG. 1B shows the exemplary embodiment in FIG. 1A in a reduced form, that is to say without control lines and with no vapor separation system. FIG. 1C shows the cooling system in FIG. 1A with a bypass 38 that can be controlled by means of a control element 41 making it possible to avoid the gas coolant heat exchanger 24. Additionally, by including the control element 41, the control element 40 shown in FIGS. 1A-B may not be needed in the embodiment shown in FIG. 1C. This also allows a heat transfer from the exhaust gases to the coolant to be averted, making it possible to dispense with a control element in the branch line 26, as can be seen from the example. In this example, opening the control element 41 may divert the flow of coolant in the auxiliary cooling system 6 around the gas-coolant heat exchanger 24 such that less heating is provided to the coolant. Further, in the embodiment shown in FIG. 1C, exhaust gases may flow continuously through the gas-coolant heat exchanger 24 regardless of how much coolant flow through the gas-coolant heat exchanger 24. The control unit 28 may adjust a position of the control element 41.

Not only the control element 41 of the bypass 38 (FIG. 1C), but also the control element 40 of the branch line 26 (FIGS. 1A and 1B) can be controlled by the control unit 28 so that the relevant lines are opened or closed. As such, opening, closing, or adjusting the control elements into an intermediate position between fully opened and closed, may adjust the amount of heating provided to the coolant. A continuously variable control between the maximum positions (opened, closed) is naturally also feasible.

As discussed above, if the heat recovery element 23 is embodied as a gas-coolant heat exchanger 24 (gas-liquid heat exchanger), exhaust gases from the internal combustion 1 may be fed to the heat recovery element 23, so that heat from the hot exhaust gases can be transmitted to the coolant of the auxiliary cooling system 6 fed to the heat recovery element 23. In this case a branch line 26 may emerge from the exhaust path, be led to the heat recovery element 23 and from this may terminate as return line 27 in the exhaust path. The branch line may emerge from the exhaust path upstream of any exhaust gas aftertreatment systems, in which case a branch should be arranged as close as possible to the exhaust gas outlet side of the internal combustion engine, as close as possible to an exhaust manifold. In the case of this development a central control module can be connected only to the auxiliary pump and to the exhaust housing (e.g., coolant exit housing) by means of monitoring and control lines, in order to allow coolant to circulate in the auxiliary cooling system, which can again be controlled as a function of parameters. The auxiliary pump 21 is therefore activated, for example, when the charge-air temperature exceeds a specific limit (cooling mode) or when the coolant in the charge-air intercooler is heated by exhaust gas (heating mode). It would also be advantageous if an additional control element were to be opened in the exhaust line, that is to say in the branch line. As before, an alternative possibility would be a system in which the heat recovery element can be avoided by means of a bypass, thereby also allowing the omission of a control element 40.

In the exemplary embodiment shown in FIG. 2A, the heat recovery element 23 is embodied as a coolant-coolant heat exchanger 32 (e.g., liquid-liquid heat exchanger). Suitable provision is made for coolant from the main cooling system 4, which in one embodiment is drawn from a bypass 14 of the main cooling system avoiding a main radiator 12, to be fed to the heat recovery element 23, through which the coolant of the auxiliary cooling system 6 flows. In this way, the heat of the hot (e.g., heated) coolant from the main cooling system 4 can be transmitted to the coolant in the auxiliary cooling system 6, downstream of the low-temperature cooler 18. The bypass 14 is provided anyhow, in order to avoid cooling of the coolant through the main radiator 12, which is particularly advisable in a warm-up phase of the internal combustion engine 1, since warmed coolant is thus fed to the internal combustion engine 1 so as to avoid friction losses. The bypass 14 emerges from an exhaust housing 9, which is arranged on the cylinder head, and leads to the coolant pump 7. From the coolant pump 7, the coolant is fed to the internal combustion engine 1 again.

As shown in FIG. 2A, coolant (e.g., engine coolant) from the main cooling system 4 is fed to the coolant-coolant heat exchanger 32 in a feed line 33 that branches off from the bypass 14 and leads to the heat recovery element 23. A return line 34 arranged at an outlet side of the heat recovery element 23 returns the coolant drawn from the bypass 14 back to thermostat 7.

Otherwise, the main cooling system 4, the auxiliary cooling system 6, and the heat recovery element 23 in FIG. 2A are designed and arranged as described in relation to FIG. 1A. The only difference is that instead of terminating in the coolant line 8, as described in relation to FIG. 1A, the return line 17 of the vapor separator 16 terminates in the return line 34, which terminates in the thermostat 7, as shown in the example in FIG. 2A.

A further difference between the exemplary embodiment according to FIG. 2A and the exemplary embodiment according to FIG. 1A is that in the feed line 33 leading from the bypass 14 to the coolant-coolant heat exchanger 32, a control element 36, which in the exemplary development is embodied as a controllable valve, is arranged upstream of said heat exchanger, so that in operation the volumetric throughput of the feed line 33 can be controlled. Said another way, the control element 36 is arranged upstream of the coolant-coolant heat exchanger 32 (e.g., heat recovery element 23) and within the feed line 33, the feed line 33 coupled between the bypass 14 and the heat recovery element 23. For this purpose the control element 36 is connected via a control line 37 to the central control unit 28, which as described with reference to FIG. 1A is connected by the control line 29 to the auxiliary pump 21 and by the monitoring line 30 to the temperature sensor 31. On an outlet side, the heat recovery element 23 is connected via the return line 34 to the coolant pump 7, so that coolant drawn from the bypass 14 is returned to the main cooling system 4.

Thus, heat sustained in the coolant of the main cooling system 4 may be recovered and used to heat the coolant in the auxiliary cooling system 6, so that coolant at a temperature in excess of the dew point of the medium to be cooled (charge air which is composed of fresh air and recirculated exhaust gases) is fed to the charge-air intercooler 2. The cooling systems here are purposively separated from one another, the coolant flows likewise not mixing with one another.

The control element 26 in the feed line 33 leading from the bypass 14 to the heat recovery element 23 is connected to the control module 28 of the internal combustion engine 1 and/or to the central control unit, to which the auxiliary pump 21 and a temperature sensor 31 in the coolant exit housing 9 (e.g., exhaust housing) are also connected. It can thus be ensured that the control element 36 opens only when the coolant temperature in the coolant exit housing 9 has a value which is indicative of a coolant temperature of the charge-air intercooler 2 in excess of the dew point. At the same time the auxiliary pump 21 may be controlled by the control module 28 so that a coolant in the auxiliary cooling system only circulates when the parameters are suitable. Control of the auxiliary pump and of the valve therefore ensue, for example, when the charge-air temperature exceeds a specific limit (cooling mode, dependent upon various values, such as, for example the engine temperature, speed, load etc.) or when heated coolant from the main cycle is available to heat the coolant in the charge-air intercooler (heating mode dependent on the same values). An alternative possibility would be a system in which the heat recovery element can be avoided by means of a bypass. As such, the control element 36 may not be included or may be avoided.

Merely for reasons of clarity, FIG. 2B shows the exemplary embodiment in FIG. 2A in a reduced form, that is to say without control lines and with no vapor separation system. FIG. 2C shows the cooling system in FIG. 2A with a bypass 39 that can be controlled by means of a control element 50 making it possible to avoid (e.g., pass around and not pass through) the coolant-coolant heat exchanger 32.

The control element of the bypass (FIG. 2C) can be controlled so that the bypass 39 is opened or closed. In another example, the control unit 28 may actuate the control element 50 into an intermediate position between fully open and fully closed to adjust the amount of coolant flow t through the bypass 39. A continuously variable control between the maximum positions (opened, closed) is naturally also feasible.

It can be seen that in this way the heat of the coolant is recovered, so that the coolant of the auxiliary cooling system 6 is heated by the heat inherent in the coolant of the main cooling system 4, which can be achieved through simple heat transfer from the coolant to the coolant of the auxiliary cooling system. The coolant of the auxiliary cooling system can thus be heated to a temperature in excess of the dew point of the medium to be cooled, so that a condensation of water contained in the charge air can be avoided.

In both embodiments, the heat generated by the internal combustion engine is recovered. It is thus possible to heat the coolant in the auxiliary cooling system in excess of a dew point of the medium to be cooled, without the need to generate additional heat, which would either place a load on the electrical system of the vehicle, and/or entail additional fuel consumption.

Turning now to FIG. 3, a method 300 is shown for adjusting heating of coolant in an auxiliary cooling system. Instructions for executing method 300 may be stored on a memory of a controller, such as control unit 28 shown in FIG. 1A and FIG. 2A. The heat recovery element described in method 300 may be a gas-coolant heat exchanger as described above with reference to FIGS. 1A-C or a coolant-coolant heat exchanger as described above with reference to FIGS. 2A-C. As such, the heating medium flowing through the heat recovery element may either be hot exhaust gas or heated engine coolant.

Method 300 begins at 302 by estimating and/or measuring engine operating conditions. Engine operating conditions may include charge air temperature (e.g., temperature of the air flowing through the charge-air intercooler), engine coolant temperature, charge-air intercooler coolant temperature (e.g., auxiliary coolant temperature), exhaust gas temperature, engine temperature, charge-air intercooler pressure, humidity, engine speed/load, etc. At 304, the method includes determining a charge air dew point temperature. In one example, the charge air dew point temperature may be the temperature at which condensate may form within the charge-air intercooler. The charge air dew point temperature may be based on one or more of charge-air intercooler temperature (e.g., charge air temperature), charge-air intercooler pressure, and/or humidity.

At 306, the method includes determining if the auxiliary coolant temperature is less than the dew point temperature. The auxiliary coolant temperature being less that the dew point temperature may cause condensate to form within the charge-air intercooler due to increased cooling of the charge air. In some examples, the method at 306 may include determining if the auxiliary coolant temperature is great than a threshold, the threshold based on the charge air dew point temperature. For example, the threshold may be a temperature a small amount above or below the dew point temperature. In another embodiment, the method at 306 may include determining if the charge air temperature is less than the dew point temperature. If the auxiliary coolant temperature is less than the dew point temperature, the method continues on to 308 to increase heating provided to the auxiliary coolant. For example, the method at 308 may include increasing the temperature of the auxiliary coolant using the heat recovery element.

In one example, increasing heating of the charge-air intercooler coolant (e.g., auxiliary coolant) may include increasing an opening of a control element at 310, the control element positioned upstream of the heat recovery element in a branch line coupled between an exhaust path and the heat recovery element (e.g., control element 40 shown in FIG. 1A). This may include fully opening or increasing the opening of the control element in order to increase the flow of exhaust gas through the heat recovery element. In this way, more heat may be transferred to the auxiliary coolant, thereby increasing the temperature of the auxiliary coolant before it passed through the charge-air intercooler. In an alternate embodiment, increasing heating of the auxiliary coolant may include decreasing an opening of a control element at 312, the control element positioned in a bypass line coupled to a coolant line upstream from the heat recovery element, the bypass line bypassing the heat recovery element (e.g., control element 41 shown in FIG. 1C). As such, decreasing the opening of the control element may increase the flow of the auxiliary coolant through the heat recovery element, thereby increasing the temperature of the auxiliary coolant. In some examples, decreasing the opening of the control element may include fully closing the control element. Increasing heating to the auxiliary coolant may additionally or alternatively include activating the auxiliary pump at 314 (e.g., auxiliary pump 21 shown in FIGS. 1A-C and FIGS. 2A-C). Activating the auxiliary pump may include turning on the pump and/or increasing a pumping rate (e.g., flow rate) of the pump.

In an alternate embodiment, if the heat recovery element is a coolant-coolant heat exchanger, increasing heating to the auxiliary coolant may include increasing an opening of a control element at 316, the control element positioned upstream of the heat recovery element in a feed line coupled to a main coolant bypass line (e.g., control element 36 shown in FIG. 2A). In this way, opening or increasing the opening of the control element 36 may increase the flow of engine coolant through the heat recovery element, thereby increasing heating provided to the auxiliary coolant. In another example, increasing heating may include decreasing an opening of a control element at 318, the control element positioned in a bypass line coupled to an auxiliary coolant line and bypassing the heat recovery element (e.g., control element 50 shown in FIG. 2C). In this way, closing or decreasing the opening of the control element 50 may increase the flow of auxiliary coolant through the heat recovery element, thereby increasing heating provided to the auxiliary coolant. Increasing heating to the auxiliary coolant may additionally or alternatively include activating the auxiliary pump at 314 (e.g., auxiliary pump 21 shown in FIGS. 1A-C and FIGS. 2A-C). Activating the auxiliary pump may include turning on the pump and/or increasing a pumping rate (e.g., flow rate) of the pump.

Returning to 306, if the auxiliary coolant temperature is not greater than the dew point temperature, the method continues on to 320 to determine if the auxiliary coolant temperature is greater than a threshold. The threshold may be an upper threshold above which the charge air entering the engine may cause unstable combustion. As such, when the dew point temperature is above the upper threshold temperature, the auxiliary coolant temperature may need to be decreased. Thus, the method continues on to 322 to enter a cooling mode including increasing cooling of the coolant. Increasing cooling of the coolant may include one or more of decreasing auxiliary coolant flow through the heat recovery element, decreasing engine coolant flow through the heat recovery element, decreasing exhaust gas flow through the heat recovery element, and/or activating the auxiliary pump to direct auxiliary coolant through the low-temperature cooler. The method at 322 may include decreasing the opening of the control element 40, increasing the opening of the control element 41, decreasing the opening of the control element 36, and/or increasing the opening of the control element 50, and/or controlling the auxiliary pump at 314.

Returning to 320, if the coolant temperature is not greater than the threshold, the method continues on to 324 to maintain operation of the cooling system. This may include maintaining positions of the various control elements and/or maintain a flow rate of the auxiliary pump. In another example, the method at 324 may include turning off the auxiliary pump.

In this way, adjusting heating provided to an auxiliary coolant flowing through an air-charge intercooler may allow for the temperature of the auxiliary coolant to be controller between an upper threshold and a lower threshold based on a charge air dew point temperature. A technical effect is achieved by adjusting heating to the auxiliary coolant by controlling heating provided to the coolant by a heat recovery element. Controlling the temperature of the auxiliary coolant in this way may allow for the reduction of condensate formation at the charge-air intercooler while also providing adequate cooling to the charge air before entering the engine. Further, the heat recovery element may use heat energy from already heated fluids within the engine, thereby utilizing available heat energy instead of having to create heat from alternate sources.

As one embodiment, a turbocharger arrangement comprises an internal combustion engine, a turbocharger for supercharging the internal combustion engine, a charge-air intercooler located in an intake tract between the turbocharger and the internal combustion engine, and an auxiliary cooling system including a first feed line for supplying a first coolant to the charge-air intercooler, the first feed line positioned upstream of the charge-air intercooler and downstream of a cooling element, the first feed line including a heat recovery element.

In one example, the heat recovery element exchanges heat between the first coolant and a heat transfer medium, the heat transfer medium including one of engine coolant or exhaust gas. A second coolant from a main cooling system is fed to the heat recovery element, a second feed line branching off from a bypass avoiding a main radiator and leading to the heat recovery element, a return line carrying the second coolant drawn from the bypass from the heat recovery element to a thermostat. A control element is arranged in the second feed line upstream of the heat recovery element. Further, the heat recovery element is a coolant-coolant heat exchanger. In another example, exhaust gases of the internal combustion engine are fed into the heat recovery element. In this example, the heat recovery element is a gas-coolant heat exchanger.

As another embodiment, a cooling system of an engine comprises a charge-air intercooler arranged between a turbocharger and the engine, a main cooling system including a coolant pump for circulating a first coolant to the engine, an auxiliary cooling system including a low-temperature cooler and a heat recovery element for circulating a second coolant to the charge-air intercooler, the heat recovery element arranged in a coolant inlet line upstream of the charge-air intercooler and downstream of the low-temperature cooler, and a branch line arranged between an exhaust housing of the engine and the heat recovery element for diverting a portion of exhaust gases from an exhaust path of the engine and to the heat recovery element.

The cooling system further comprises a return line arranged between the heat recovery element and the exhaust housing for returning exhaust gases back to the exhaust path of the engine. The cooling system further comprises a control unit with computer readable instructions for adjusting a control element in order to adjust heating of the second coolant in the heat recovery element, the adjusting based on one or more of a temperature of the first coolant, a temperature of the second coolant, or a temperature of charge air in the charge-air intercooler.

In one example, the control element is arranged in the branch line upstream of the heat recovery element. In another example, the control element is arranged in a bypass line coupled to the coolant inlet line, the bypass line bypassing the heat recovery element. The auxiliary cooling system is separated from the main cooling system so that the first coolant is not mixed with the second coolant. The heat recovery element in a gas-coolant heat exchanger. The cooling system further comprises an auxiliary pump arranged in the auxiliary cooling system upstream of the low-temperature cooler.

As yet another embodiment, a method comprises heating a coolant supplied to a charge-air intercooler by flowing coolant through a heat recovery element while also flowing exhaust gases through the heat recovery element, the heat recovery element arranged in a coolant line upstream of the charge-air intercooler and downstream of a low-temperature cooler, the heating responsive to a temperature of the coolant decreasing below a threshold, the threshold based on a dew point temperature of charge air flowing through the charge-air intercooler.

In one example, heating the coolant includes increasing heating supplied to the coolant by increasing an opening of a control element to increase flow of the coolant through the heat recovery element, the control element positioned in a branch line upstream of the heat recovery element, the branch line directing exhaust gas from an exhaust path of the engine and to the heat recovery element. In another example, heating the coolant includes increasing heating supplied to the coolant by decreasing an opening of a control element to increase flow of the coolant through the heat recovery element, the control element positioned in a bypass line coupled to the coolant line and bypassing the heat recovery element. In yet another example, heating the coolant includes activating an auxiliary pump to pump the coolant through the heat recovery element, the auxiliary pump positioned in a coolant return line between the charge-air intercooler and the low-temperature cooler. The heat recovery element is a gas-coolant heat exchanger with coolant flowing through a first side of the heat exchanger and exhaust gases flowing through a second side of the heat exchanger.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger arrangement, comprising:
an engine;
a turbocharger for supercharging the engine;
a charge-air intercooler located in an intake tract between the turbocharger and the engine;
an auxiliary cooling system including a first feed line for supplying a first coolant to the charge-air intercooler, the first feed line positioned upstream of the charge-air intercooler and downstream of a low-temperature cooler, the first feed line including a heat exchanger;
a temperature sensor coupled to a coolant exit housing of the engine configured to indicate a temperature of the first coolant supplied to the charge-air intercooler;
a bypass passage coupled to the first feed line and configured to deliver the first coolant around the heat exchanger such that the first coolant in the bypass passage avoids the heat exchanger;
a valve disposed in the bypass passage; and
a controller with computer-readable instructions stored in non-transitory memory for:
in response to the temperature of the first coolant being below a dew point, closing the valve to direct the first coolant through the heat exchanger; and
in response to the temperature of the first coolant being higher than a threshold temperature, increasing cooling of the first coolant by opening the valve to divert the first coolant around the heat exchanger, the threshold temperature being an upper threshold indicating unstable combustion.

2. The turbocharger arrangement of claim 1, wherein the heat exchanger exchanges heat between the first coolant and a heat transfer medium, the heat transfer medium including one of engine coolant or exhaust gas, and wherein the dew point is a temperature at which water contained in charge air compressed by the turbocharger condenses, the dew point determined based on one or more of a charge air temperature, a charge air intercooler pressure, or a charge air humidity.

3. The turbocharger arrangement of claim 1, wherein a second coolant from a main cooling system is fed to the heat exchanger, a second feed line branching off from a bypass avoiding a main radiator and leading to the heat exchanger, a return line carrying the second coolant drawn from the bypass from the heat exchanger to a thermostat.

4. The turbocharger arrangement of claim 1, wherein the controller includes further instructions for: in response to the temperature of the first coolant being above the dew point, opening the valve to direct the first coolant through the bypass passage.

5. The turbocharger arrangement of claim 3, wherein the heat exchanger is a coolant-coolant heat exchanger.

6. The turbocharger arrangement of claim 1, wherein exhaust gases of the engine are fed into the heat exchanger.

7. The turbocharger arrangement of claim 6, wherein the heat exchanger is a gas-coolant heat exchanger.

8. A cooling system of an engine, comprising:
a charge-air intercooler arranged between a turbocharger and the engine;
a main cooling system including a coolant pump for circulating a first coolant to the engine;
an auxiliary cooling system including an auxiliary pump, a low-temperature cooler and a heat exchanger for circulating a second coolant to the charge-air intercooler;
a first coolant inlet line having a first control element and coupled between a bypass and the heat exchanger, the first coolant inlet line configured to circulate the first coolant from the bypass to the charge-air intercooler, the bypass emerging from an exhaust housing leading to a thermostat, the first control element upstream of the heat exchanger;
a second coolant inlet line coupling the low-temperature cooler to the heat exchanger, the heat exchanger arranged in the first coolant inlet line and the second coolant inlet line upstream of the charge-air intercooler and downstream of the low-temperature cooler;
a bypass passage coupled to the second coolant inlet line having a second control element, the bypass passage configured to deliver the second coolant around the heat exchanger such that the second coolant in the bypass passage avoids the heat exchanger;
a branch line having a third control element and arranged between the exhaust housing of the engine and the heat exchanger for diverting a portion of exhaust gases from an exhaust path of the engine and to the heat exchanger, the third control element upstream of the heat exchanger; and
a control unit with computer-readable instructions for:
responsive to a first temperature condition being met, heating the second coolant circulating in the charge-air intercooler with exhaust gas; and
responsive to a second, different temperature condition being met, increasing cooling of the second coolant by activating the auxiliary pump to direct the second coolant through the low-temperature cooler, decreasing an opening of the third control element, increasing an opening of the second control element, and decreasing an opening of the first control element.

9. The cooling system of claim 8, further comprising a return line arranged between the heat exchanger and the exhaust housing for returning exhaust gases back to the exhaust path of the engine, and wherein the first temperature condition comprises a temperature of the second coolant being below a dew point temperature of charge air in the charge-air intercooler and wherein the second temperature condition comprises the temperature of the second coolant being above an upper threshold, the upper threshold indicating an unstable combustion condition.

10. The cooling system of claim 8, wherein the auxiliary cooling system is separated from the main cooling system so that the first coolant is not mixed with the second coolant.

11. The cooling system of claim 8, wherein the heat exchanger is a gas-coolant heat exchanger.

12. The cooling system of claim 8, wherein the auxiliary pump arranged in the auxiliary cooling system is arranged upstream of the low-temperature cooler.

13. A method, comprising:
while a temperature of a coolant supplied to a charge-air intercooler is below a dew point,
heating the coolant supplied to the charge-air intercooler with exhaust gases by flowing the coolant through a heat exchanger while also flowing exhaust gases through the heat exchanger,
wherein the heat exchanger is arranged in a coolant line upstream of the charge-air intercooler and downstream of a low-temperature cooler,
wherein the dew point is a dew point temperature of charge air flowing through the charge-air intercooler,
wherein the dew point is determined based on one or more of a charge air temperature, a charge air intercooler pressure, or a charge air humidity, and
wherein the temperature of the coolant is indicated based on an output of a temperature sensor mounted to an exit housing of an engine, and
while the temperature of the coolant is higher than a threshold temperature,
cooling the coolant supplied to the charge-air intercooler by decreasing exhaust gas flow through the heat exchanger, the threshold temperature being an upper threshold indicating unstable combustion.

14. The method of claim 13, wherein heating the coolant includes increasing heating supplied to the coolant by increasing an opening of a valve to increase flow of the exhaust gases through the heat exchanger, the valve positioned in a branch line upstream of the heat exchanger, the branch line directing exhaust gas from an exhaust path of the engine and to the heat exchanger; and
further comprising, while the temperature of the coolant is above the dew point and below the threshold temperature, decreasing the opening of the valve to stop the flow of the exhaust gases through the heat exchanger.

15. The method of claim 13, wherein heating the coolant includes increasing heating supplied to the coolant by decreasing an opening of a valve to increase flow of the coolant through the heat exchanger, the valve positioned in a bypass line coupled to the coolant line and bypassing the heat exchanger; and
further comprising, while the temperature of the coolant is above the dew point and below the threshold temperature, increasing the opening of the valve to decrease the flow of the coolant through the heat exchanger.

16. The method of claim 13, wherein heating the coolant includes activating an auxiliary pump to pump the coolant through the heat exchanger, the auxiliary pump positioned in a coolant return line between the charge-air intercooler and the low-temperature cooler.

17. The method of claim 13, wherein the heat exchanger is a gas-coolant heat exchanger with coolant flowing through a first side of the heat exchanger and exhaust gases flowing through a second side of the heat exchanger.

* * * * *